(12) United States Patent
Yao et al.

(10) Patent No.: US 7,377,190 B2
(45) Date of Patent: May 27, 2008

(54) METHOD AND MECHANISM OF THE SUSPENSION RESONANCE OPTIMIZATION FOR THE HARD DISK DRIVER

(75) Inventors: Ming Gao Yao, Dongguan (CN); Masashi Shiraishi, Kowloon (HK)

(73) Assignee: SAE Magnetics (H.K.), Ltd., Kwai Chung, N.T. (HK)

( * ) Notice: Subject to any disclaimer, the term of this patent is extended or adjusted under 35 U.S.C. 154(b) by 799 days.

(21) Appl. No.: 10/803,350

(22) Filed: Mar. 17, 2004

(65) Prior Publication Data
US 2005/0081368 A1 Apr. 21, 2005

(30) Foreign Application Priority Data
Oct. 16, 2003 (WO) ............ PCT/CN03/00868

(51) Int. Cl.
*G01N 19/00* (2006.01)
(52) U.S. Cl. .................................. 73/865.9
(58) Field of Classification Search ............ 73/1.79, 73/865.9
See application file for complete search history.

(56) References Cited

U.S. PATENT DOCUMENTS

| | | | |
|---|---|---|---|
| 4,416,144 A * | 11/1983 | Chen et al. ............ 73/12.09 |
| 5,979,249 A | 11/1999 | Koo et al. ............ 73/862.541 |
| 6,201,668 B1 | 3/2001 | Murphy ................ 360/294.4 |
| 6,549,020 B2 * | 4/2003 | Lim et al. ............... 324/701 |
| 2002/0141117 A1 | 10/2002 | Kasajima et al. ........ 360/294.4 |
| 2002/0154450 A1 | 10/2002 | Kasajima et al. ........ 360/294.4 |

FOREIGN PATENT DOCUMENTS

| | | |
|---|---|---|
| JP | 5109058 A2 | 4/1993 |
| JP | 9147356 A2 | 6/1997 |
| JP | 2000268517 A2 | 9/2000 |
| JP | 2002074870 A2 | 3/2002 |
| JP | 2002074871 A2 | 3/2002 |
| JP | 2002289936 A2 | 10/2002 |

* cited by examiner

*Primary Examiner*—Hezron Williams
*Assistant Examiner*—Rodney Frank
(74) *Attorney, Agent, or Firm*—Kenyon & Kenyon LLP

(57) ABSTRACT

A system and method are disclosed for using a test slider to test the resonance performance of a head gimbal assembly. The test slider has a two-stripe air-bearing surface to allow the test slider to glide above a surface and a block with a mass equal to the combined mass of the electrical slider and the micro-actuator. The leading edge of the slider is tapered and has a main air groove to facilitate gliding. A back step on the side of the test slider opposite the air bearing surface maintains a parallel gap between the slider and the suspension tongue of the head gimbal assembly.

10 Claims, 8 Drawing Sheets

*Figure 6*

METHOD AND MECHANISM OF THE SUSPENSION RESONANCE OPTIMIZATION FOR THE HARD DISK DRIVER

BACKGROUND INFORMATION

The present invention is directed to attaching a slider to a head suspension. More specifically, the present invention pertains to reducing the amount of adhesive needed to couple the slider to the head suspension.

Figure 1:
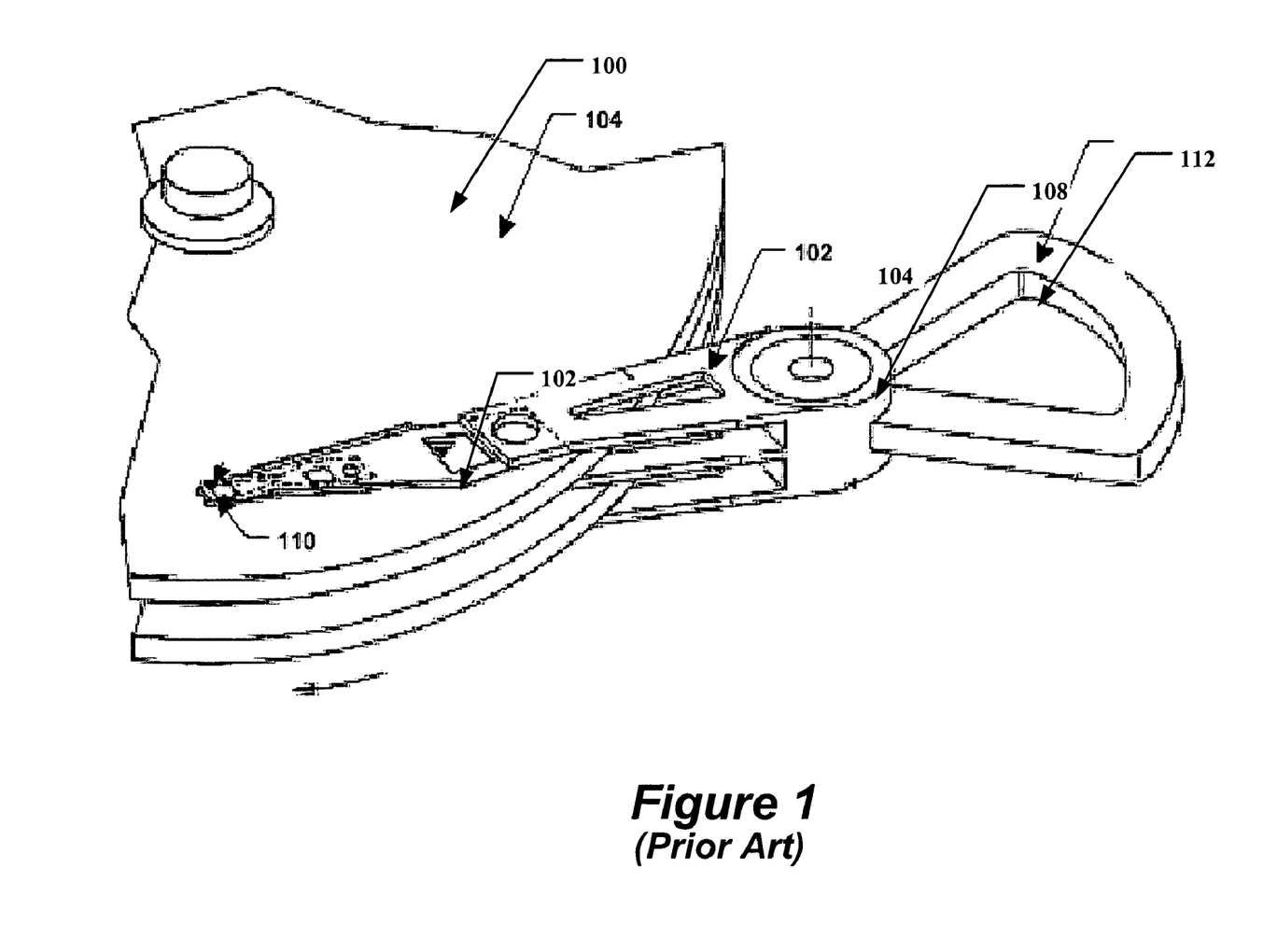
FIG. 1 illustrates a hard disk drive design typical in the art.

FIG. 1 illustrates a hard disk drive design typical in the art. Hard disk drives 100 are common information storage devices consisting essentially of a series of rotatable disks 104 that are accessed by magnetic reading and writing elements. These data transferring elements, commonly known as transducers, are typically carried by and embedded in a slider body 110. The slider 110 is held in a close relative position by a head gimbal assembly (HGA), including a suspension 102 attached to an actuator arm 106, over discrete data tracks formed on a disk to permit a read or write operation to be carried out. The HGA is rotated around a pivot 108 by a voice coil motor 112. In order to properly position the transducer with respect to the disk surface, an air bearing surface (ABS) formed on the slider body 110 experiences a fluid air flow that provides sufficient lift force to "fly" the slider 110 (and transducer) above the disk data tracks. The high speed rotation of a magnetic disk 104 generates a stream of air flow or wind along its surface in a direction substantially parallel to the tangential velocity of the disk. The air flow cooperates with the ABS of the slider body 110 which enables the slider to fly above the spinning disk. In effect, the suspended slider 110 is physically separated from the disk surface 104 through this self-actuating air bearing. The ABS of a slider 110 is generally configured on the slider surface facing the rotating disk 104 (see below), and greatly influences its ability to fly over the disk under various conditions.

Figure 2A:
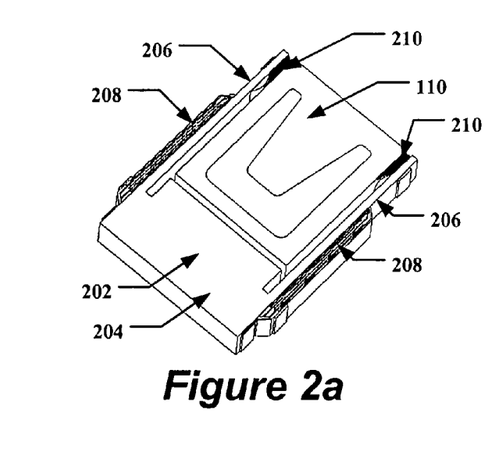
FIGS. 2a-d illustrates a prior art method for coupling a slider and micro-actuator to the suspension of an actuator arm.

FIGS. 2a-d illustrates a prior art method for coupling a slider 110 and micro-actuator 202 to the suspension 102 of an actuator arm 104. As shown in FIG. 2a, a slider 110 is coupled to a micro-actuator 202. The micro-actuator 202 provides a finer degree of slider movement control than the actuator arm 104. The micro-actuator 202 has a base 204 with two arms 206 projecting from the base 204. A stripe of piezoelectric (PZT) material 208 is coupled to the side of each actuator arm 206. An electric charge applied to the PZT stripe 208 causes it to expand or contract, moving the actuator arms 206. The slider 110 is bonded to the actuator arms 206 at the bonding points 210.

Figure 2B:
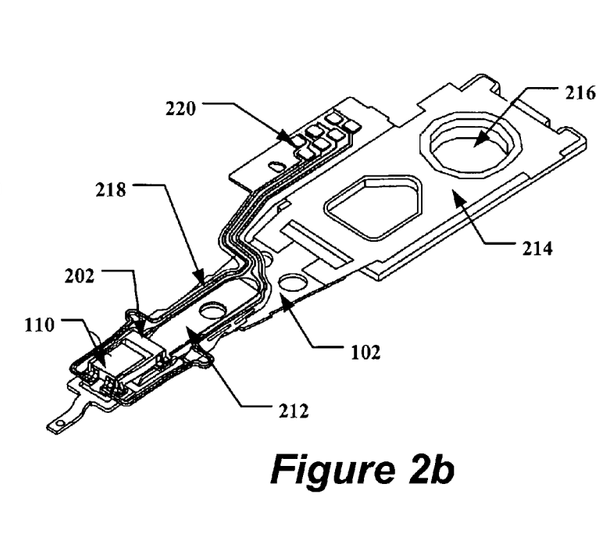
Figure 2C:
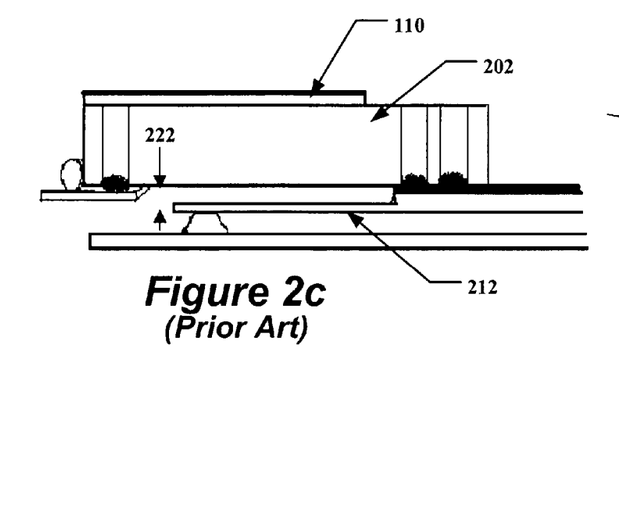

As shown in FIG. 2b, the micro-actuator 202 is couple to the suspension 102 via a suspension tongue 212. The suspension 102 is coupled to a base plate 214. The base plate has a hole 216 that allows the base plate 214 to rotate around a pivot. A series of traces 218 run the length of the suspension 102 and suspension tongue 212 to be electrically coupled to the slider 110 and the micro-actuator 202. The traces 218 are electrically coupled to a control circuit via a series of bonding pads 220 mounted on the base plate 214. As shown in FIG. 2c, the micro-actuator 202 is positioned so as to maintain a gap 222 between it and the suspension tongue 212 and by extension between the slider 110 and the suspension tongue 212.

Figure 2D:
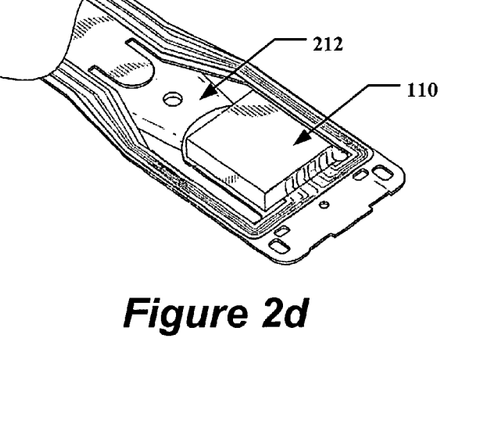

The resonance performance of the suspension is a major factor in the resonance control of the HGA. The resonance performance is optimized during the manufacturing process in order to improve resonance control. The traditional method for testing the resonance performance of the suspension is to use a mechanical HGA. As shown in FIG. 2d, an actual slider 110 is fully potted to the suspension tongue 212 to create a mechanical HGA. The mechanical HGA is loaded into a resonance tester. The resonance tester can use a laser Doppler to monitor or sample the frequency response during mechanical shaking of the HGA base plate. Corrections can be made to the manufacturing process or the design based on the results of the test. The slider in this instance is easily recycled after testing is completed.

This testing method becomes more difficult for an HGA that includes a micro-actuator. Mounting the micro-actuator in addition to the slider requires a much more accurate mounting machine or fixture, mainly to maintain a parallel gap between the micro-actuator and the suspension tongue. Additionally, the micro-actuator is not so easily used and recycled as the micro-actuator is fragile and its manufacture is difficult and expensive.

DETAILED DESCRIPTION

A system and method are disclosed for using a test slider to test the resonance performance of a head gimbal assembly. In one embodiment, the test slider has a two-stripe air-bearing surface to allow the test slider to glide above a surface and a block with a mass equal to the combined mass of the electrical slider and the micro-actuator. The leading edge of the slider is tapered and has a main air groove to facilitate gliding. A back step on the side of the test slider opposite the air bearing surface maintains a parallel gap between the slider and the suspension tongue of the head gimbal assembly.

In one embodiment, the mechanical head gimbal assembly (HGA) is loaded on a removable HGA mounting block. The block is loaded onto the resonance shaker of a resonance tester. The resonance tester can precisely measure the mechanical resonance of the HGA. The resonance tester can use a laser Doppler vibrometer to monitor or sample the frequency response during mechanical shaking of the HGA base plate. The resonance tester provides an output plot of the magnitude and the phase vs. the frequency. Additionally, the resonance tester provides a listing of the amplitudes and frequency of the resonance peak to be processed by a fourier analyzer. This allows the suspension resonance to be controlled during the design and manufacture process. If the resonance frequency shift or gain is higher than the expectation, corrections can be made to the manufacturing process or the design based on the results of the test. Corrections include, for example, the modification of the geometry of the suspension structure or the optimization of the manufacture process. The test slider is easily recycled after testing is completed.

Figure 3A:
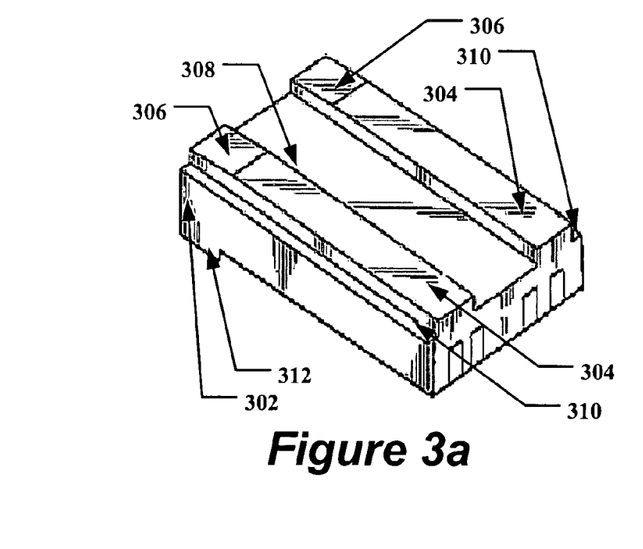
FIGS. 3a-d illustrate a test slider 302 according to embodiments of the present invention.
Figure 3B:
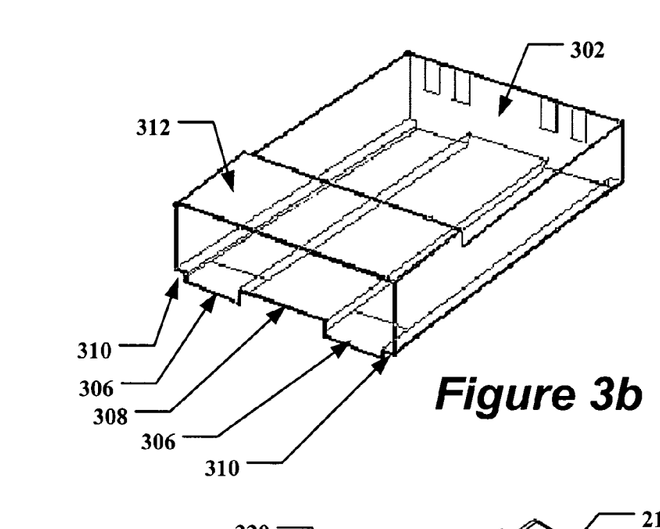
Figure 3C:
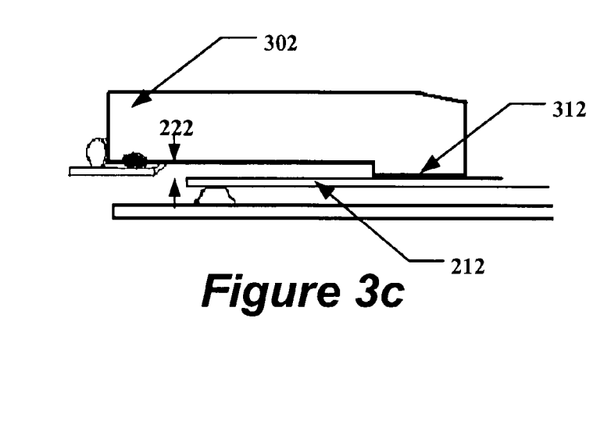
Figure 3D:
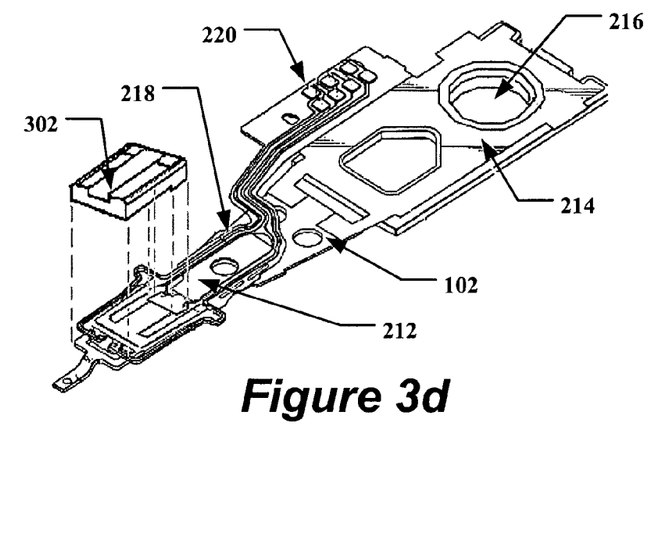

FIGS. 3a-d illustrate one embodiment of a test slider 302. The mechanical block of the test slider 302 has a mass and external form equivalent to the mass of a normal slider 110 and micro-actuator 202 combined. The air bearing characteristic of the test slider is substantially equivalent to a slider and micro-actuator. As shown in FIG. 3a, the test slider 302 has an air bearing surface (ABS) 304, which allows the slider on a current of air above a surface, such as the hard disk of a disk drive. In the embodiment shown, the ABS 304 has two stripes. The edges 306 of each stripe 304 are tapered at the leading edge of the test slider 302, to guide the air onto the slider ABS and ease the slider take off, maintaining the head flying on the disk by a consistent force. A main air groove 308 is located between the two ABS stripes 304. A side rail surface indentation 310 is located on the outer side of each ABS stripe 304. The side rail surface indentation 310 reduces the risk of a head crash or shock to the disk due to sharp corners when the head is loaded on and unloaded off the disk. As shown in the embodiment of FIG. 3b, the side of the test slider opposite the ABS stripes 304 may have a step 312. The step 312 can be on the leading edge of the slider 302. As shown in FIG. 3c, the step 312 maintains the gap 222 between the test slider 302 and the suspension tongue 212. As shown in FIG. 3d, the test slider 302 is coupled to the suspension 102 to test the resonance control of the suspension 102. In one embodiment, the test slider 302 is coupled to the suspension 102 by partially potting the surface of the step 312 before mounting it to the suspension tongue 212. Epoxy or resin may be used for coupling. Epoxy may be partially added to the leading edge of the suspension tongue 212 or on the step surface 312 of the testing slider for more secure mounting.

Figure 4A:
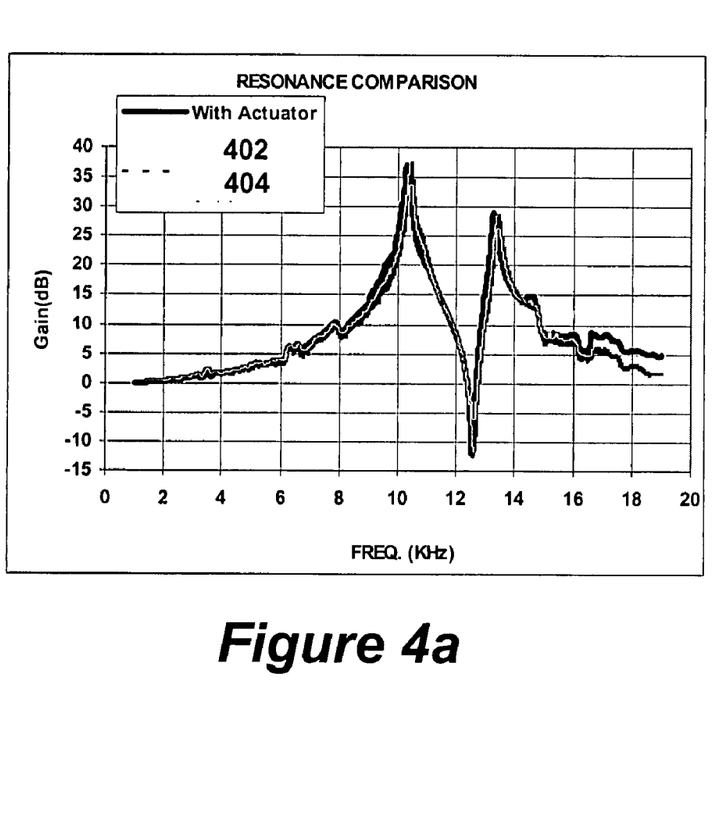
FIGS. 4a-b illustrate in graph form a comparison of the performance of a slider and micro-actuator and a test slider.
Figure 4B:
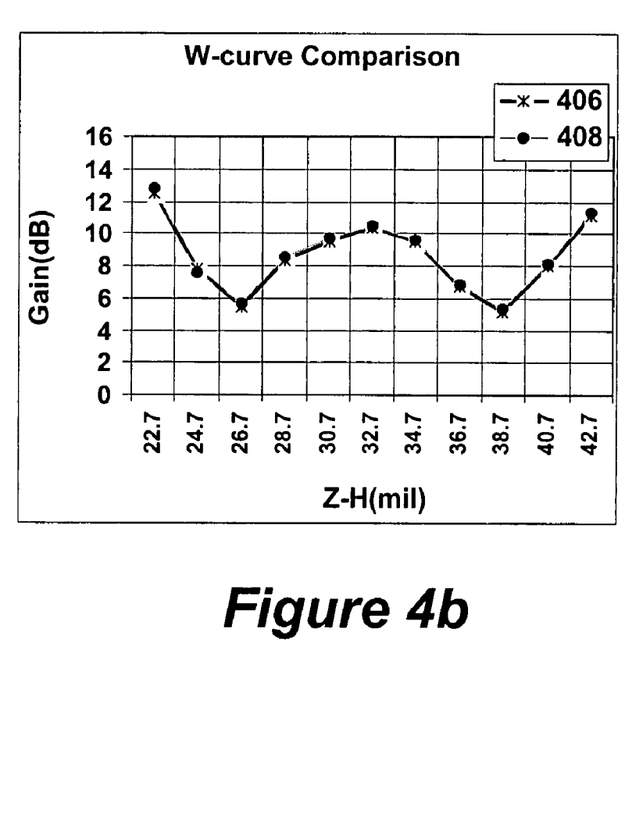

FIGS. 4a-b illustrate in graph form a comparison of the performance of a slider and micro-actuator and a test slider. As shown in FIG. 4a, a resonance comparison of gain in dB to frequency in kHz for the slider with micro-actuator 402 and the test slider 404 produces nearly identical results. As shown in FIG. 4b, a w-curve comparison of gain in dB to the zenith height in millionths of an inch for the slider with micro-actuator 406 and the test slider 408 produces nearly identical results.

Figure 5A:
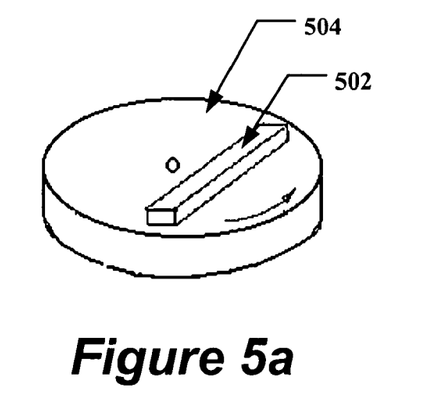
FIGS. 5a-p illustrate a process for fabricating the test slider according to embodiments of the present invention.
Figure 5B:
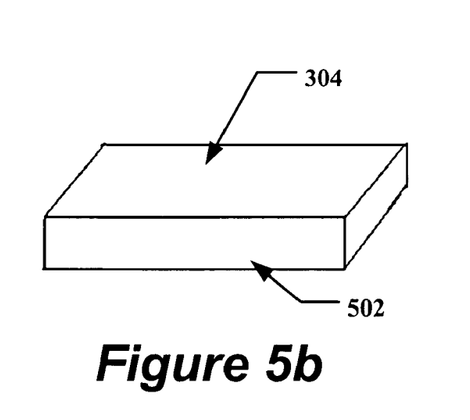
Figure 5C:
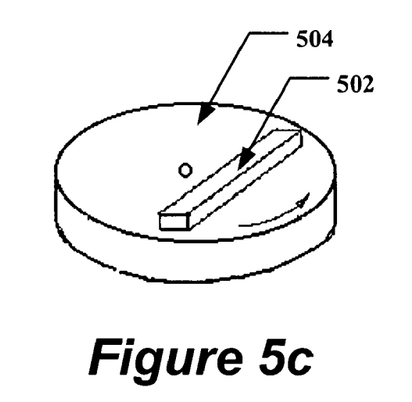
Figure 5D:
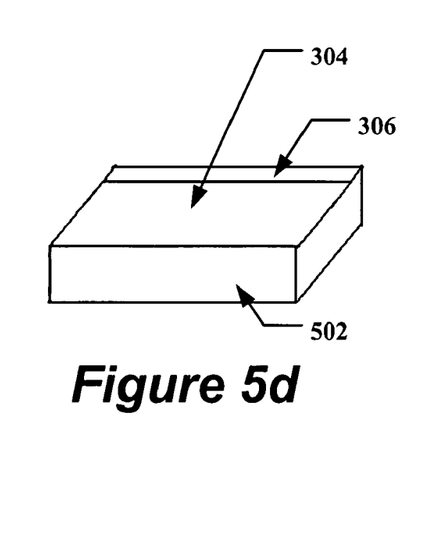
Figure 5E:
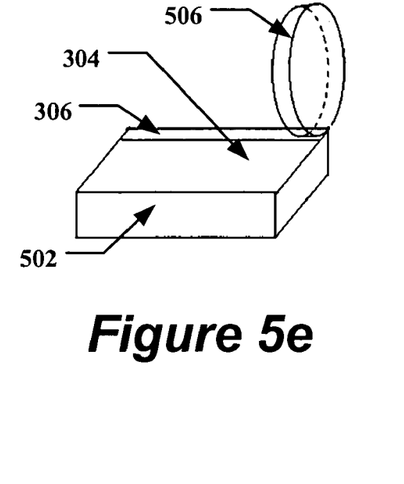
Figure 5F:
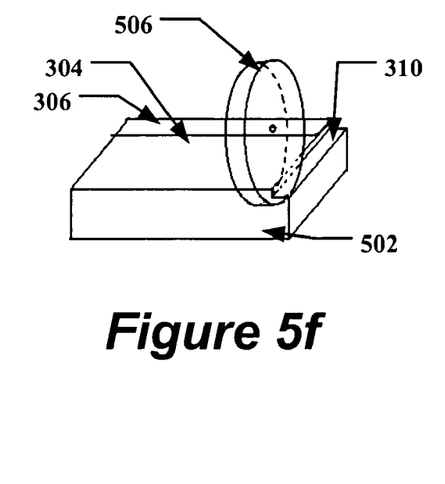
Figure 5G:
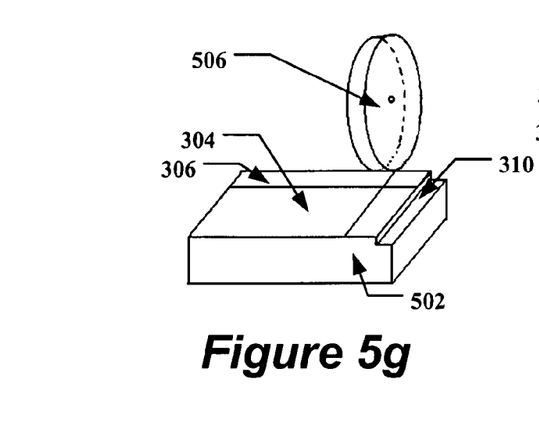
Figure 5H:
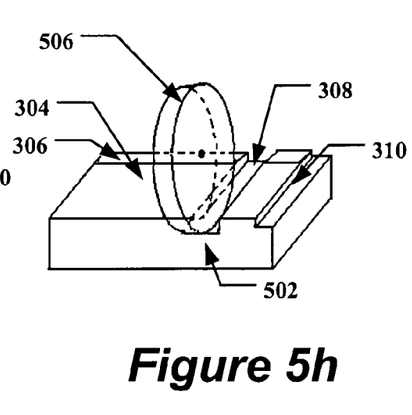
Figure 5I:
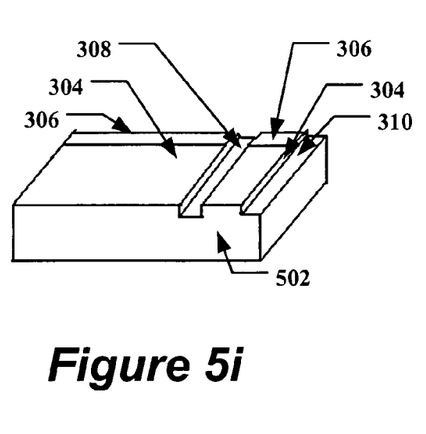
Figure 5J:
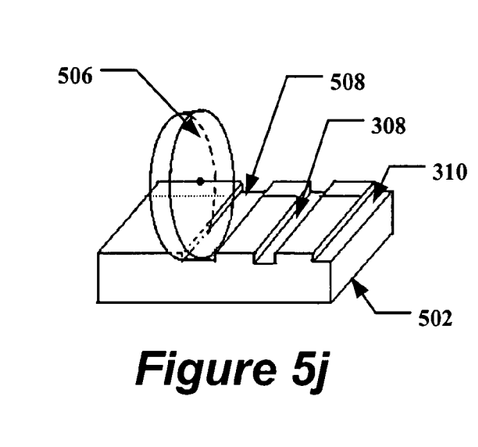
Figure 5K:
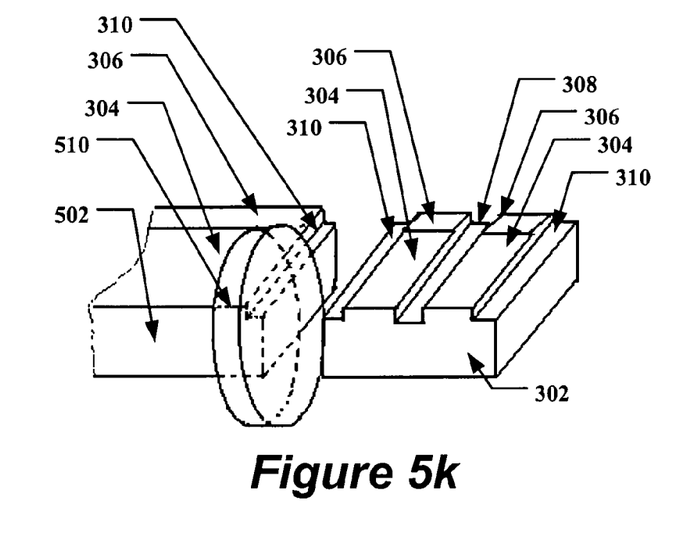
Figure 5L:
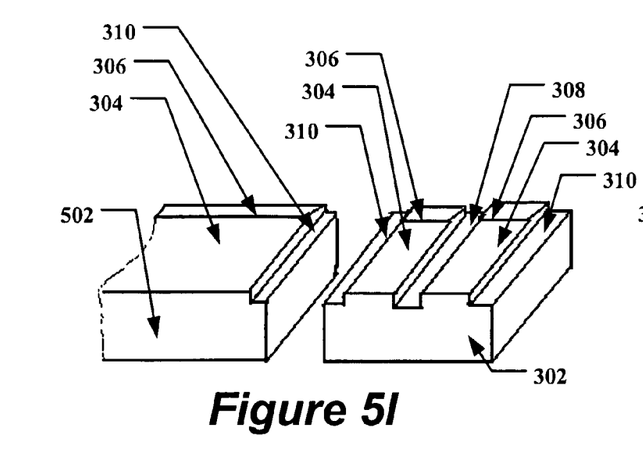
Figure 5M:
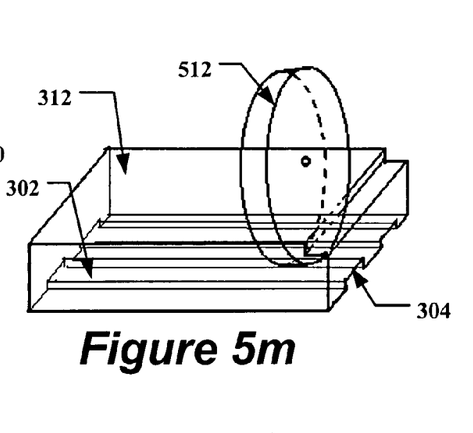
Figure 5N:
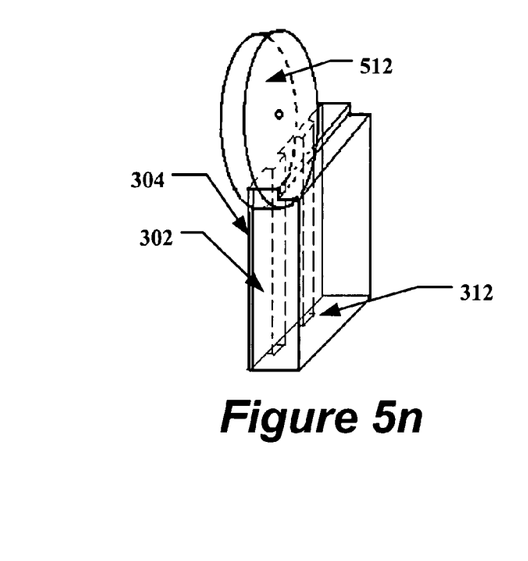
Figure 5P:
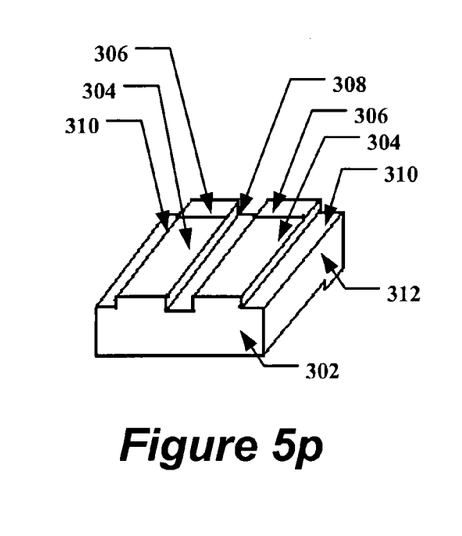

FIGS. 5a-p illustrate one embodiment of a process for fabricating the test slider. As shown in FIG. 5a, a ceramic row bar 502 is applied to a lapping wheel 504. The lapping wheel 504 creates a smooth air bearing surface 304 on the row bar 502, as shown in FIG. 5b. As shown in FIG. 5c, the leading edge of the row bar 502 is applied to the lapping wheel 504. The lapping wheel 504 creates a tapered edge 306 on the air bearing surface 304 of the row bar 502, as shown in FIG. 5d. As shown in FIG. 5e, a grinding wheel 506 is applied to the row bar 502. The grinding 506 wheel creates side rail surface indentation 310, as shown in FIG. 5f. As shown in FIG. 5g, a grinding wheel 506 is again applied to the row bar 502. The grinding 506 wheel grinds a tract across the row bar, as shown in FIG. 5h. This tract acts as the main air groove 308, as shown in FIG. 5i. As shown in FIG. 5j, a grinding wheel 506 is applied to the row bar 502. The grinding 506 wheel creates a tract 508. In one embodiment, the tract 508 is twice the width of a side rail surface indentation 310. A cutting wheel 510 then cuts down the center of the tract 508, splitting the tract 508 into two side rails 310, as shown in FIG. 5k. Alternatively, the grinding wheel 506 is used to grind through the row bar 502 at the center of the tract 508, with the tract 508 widened to accommodate the wider wheel 506. The severed piece of the row bar 502 is the test slider 302, as shown in FIG. 5l. As shown in FIG. 5m, the edge of a grinding wheel 512 is applied to the side opposite the air bearing surface 304 to produce a step 312. In an alternate embodiment shown in FIG. 5n, the edge of a grinding wheel 512 is applied to the side opposite the leading edge to produce a step 312. The result is cleaned to produce a finished test slider 302 shown in FIG. 5p.

Figure 6:
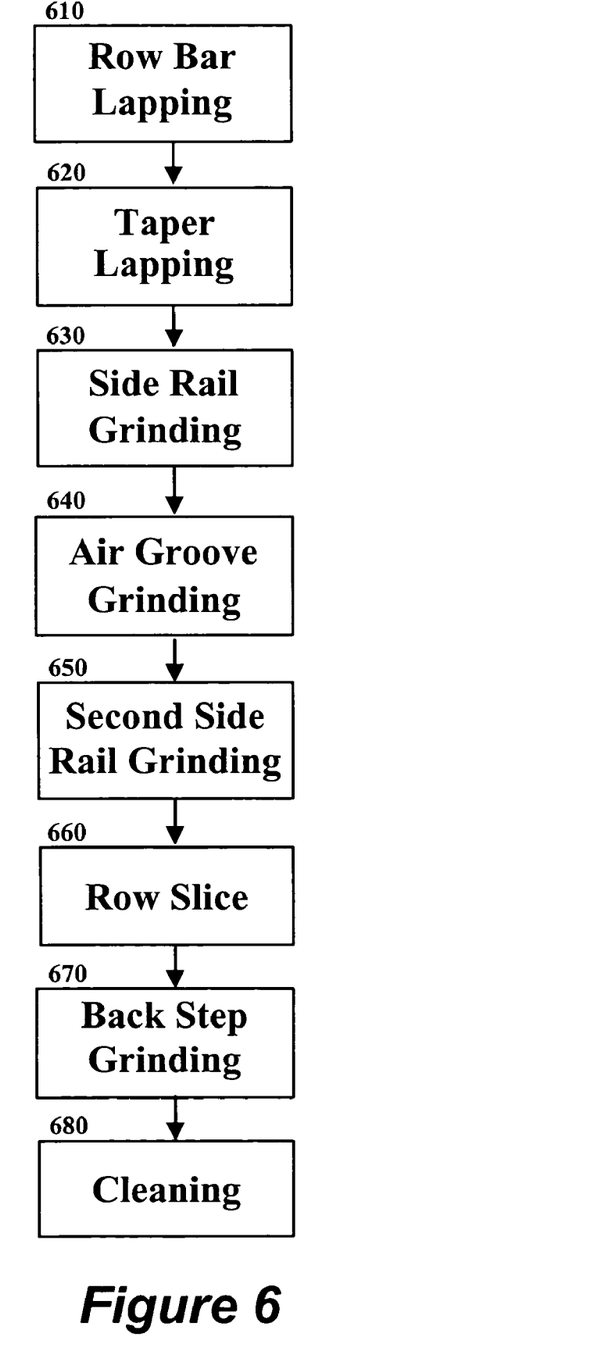
FIG. 6 illustrates in a flowchart a process for fabricating a test slider according to embodiments of the present invention.

FIG. 6 illustrates in a flowchart one embodiment of a process for fabricating a test slider 302. The row bar 502 is lapped to create a smooth air bear surface 304 (Block 610). The row bar 502 is then lapped to create a tapered surface 306 at the leading edge (Block 620). A side rail surface indentation 310 is ground out of the edge adjacent to the leading edge of the row bar 502 on the air bearing surface 304 (Block 630). The main air groove 308 is then ground out of the row bar 502 on the air bearing surface 304 parallel to the side rail surface indentation 310 (Block 640). A second side rail surface indentation 508 double the size of the first is ground out of the row bar 502 on the air bearing surface 304 (Block 650). The row bar 502 is then sliced through at the center of the second side rail surface indentation 508 (Block 660). A step 312 is ground out of the back of the test slider 302 (Block 670). The test slider 302 is then cleaned and is ready for use (Block 680).

What is claimed is:

1. A method comprising the steps of:
    coupling a test slider to a suspension in place of a slider with micro-actuator; and
    measuring a resonance and W-curve of the suspension.

2. The method of claim 1, wherein the test slider has a mass substantially equivalent to the slider with micro-actuator.

3. The method of claim 2, wherein the test slider has an external form substantially equivalent to the slider with micro-actuator.

4. The method of claim 1, wherein the test slider has a weight balance substantially equivalent to the slider with micro-actuator.

5. The method of claim 1, wherein the test slider has an air bearing characteristic substantially equivalent to the slider with micro-actuator.

6. The method of claim 1, wherein the test slider has an air bearing surface to allow the test slider to glide above a disk media surface.

7. The method of claim 6, wherein the test slider has a step on a side of the block opposite the air bearing surface to maintain a gap between the test slider and a suspension.

8. The method of claim 7, wherein the test slider is coupled to the suspension by partially potting adhesive on a surface of the step.

9. The method of claim 1, wherein the test slider is coupled to the suspension by partial potting.

10. The method of claim 1, further comprising amending mechanically the suspension when the measured resonance is out of a predetermined scope.

* * * * *